US012106662B1

(12) United States Patent
Jhamb

(10) Patent No.: US 12,106,662 B1
(45) Date of Patent: Oct. 1, 2024

(54) MACHINE LEARNING TRAFFIC DETERMINATION

(71) Applicant: Aaditya Jhamb, Surrey (GB)

(72) Inventor: Aaditya Jhamb, Surrey (GB)

( * ) Notice: Subject to any disclaimer, the term of this patent is extended or adjusted under 35 U.S.C. 154(b) by 0 days.

(21) Appl. No.: 18/538,729

(22) Filed: Dec. 13, 2023

(51) Int. Cl.
*G08G 1/01* (2006.01)
*G01C 21/34* (2006.01)
*G06N 5/022* (2023.01)

(52) U.S. Cl.
CPC ....... *G08G 1/0129* (2013.01); *G01C 21/3415* (2013.01); *G06N 5/022* (2013.01)

(58) Field of Classification Search
CPC ... G08G 1/0129; G01C 21/3415; G06N 5/022
USPC .......................................................... 701/117
See application file for complete search history.

(56) References Cited

U.S. PATENT DOCUMENTS

| | | | |
|---|---|---|---|
| 9,189,451 B1* | 11/2015 | Freedman | H04N 23/73 |
| 10,755,560 B2* | 8/2020 | Marecek | G08G 1/0116 |
| 10,970,569 B2* | 4/2021 | Slater | G06T 7/12 |
| 11,162,800 B1* | 11/2021 | Carbery | G01C 21/28 |
| 2004/0039517 A1* | 2/2004 | Biesinger | G08G 1/096775 340/907 |
| 2017/0272338 A1* | 9/2017 | Borrel | H04W 4/023 |
| 2018/0188050 A1* | 7/2018 | Duan | G08G 1/0141 |
| 2018/0350230 A1* | 12/2018 | Kienitz | G08G 1/0116 |
| 2019/0206238 A1* | 7/2019 | Hofsaess | G08G 1/08 |
| 2019/0385447 A1* | 12/2019 | Marecek | G08G 1/04 |
| 2020/0126410 A1* | 4/2020 | Voncken | G01C 21/3492 |
| 2022/0234414 A1* | 7/2022 | Wingfield | G08G 1/096822 |
| 2023/0073038 A1* | 3/2023 | Madan | G08G 1/0962 |
| 2023/0075077 A1* | 3/2023 | Yin | G01C 21/3461 |
| 2024/0031017 A1* | 1/2024 | Barton | H04B 7/18584 |

FOREIGN PATENT DOCUMENTS

| | | | | |
|---|---|---|---|---|
| EP | 3217400 A1 * | 9/2017 | | G01M 15/10 |
| WO | WO-2016027244 A1 * | 2/2016 | | G01N 33/0075 |

OTHER PUBLICATIONS

Omar et al., "IoT Based: Air Quality Index and Traffic Volume Correlation," 2020, Publisher: IEEE.*

* cited by examiner

*Primary Examiner* — Tuan C To
(74) *Attorney, Agent, or Firm* — Kunzler Bean & Adamson

(57) ABSTRACT

Apparatuses, systems, methods, and computer program products for machine learning traffic determination. A method includes receiving an image of vehicular traffic taken by an image sensor. A method includes receiving environmental data from a plurality of environmental sensors. A method includes determining a history of vehicular traffic in a geographic area associated with an image sensor. A method includes processing an image of vehicular traffic, environmental data, and a history of vehicular traffic using one or more machine learning models to predict a traffic level and a pollution level for a geographic area. A method includes communicating one or more of a predicted traffic level and a predicted pollution level to a user on an electronic display screen of a hardware computing device.

20 Claims, 6 Drawing Sheets

MACHINE LEARNING TRAFFIC DETERMINATION

FIELD

This invention relates to traffic determination and more particularly relates to predicting traffic and/or pollution using machine learning.

BACKGROUND

Traffic congestion is annoying and time consuming. More than that, traffic congestion can cause air and other environmental pollution, noise pollution, and the like.

SUMMARY

Apparatuses for machine learning traffic determination are presented. In one embodiment, an apparatus includes an image sensor. An apparatus, in some embodiments, includes a plurality of environmental sensors. In certain embodiments, an apparatus includes an electronic hardware traffic device in communication with an image sensor and/or a plurality of environmental sensors. An electronic hardware traffic device, in a further embodiment, includes a processor and a memory storing computer program code executable by the processor to perform operations. An operation, in one embodiment, includes receiving an image of vehicular traffic taken by an image sensor. An operation, in certain embodiments, includes receiving environmental data from a plurality of environmental sensors. In some embodiments, an operation includes determining a history of vehicular traffic in a geographic area associated with an image sensor. An operation, in a further embodiment, includes processing an image of vehicular traffic, environmental data, and/or a history of vehicular traffic using one or more machine learning models to predict a traffic level and/or a pollution level for a geographic area. An operation, in some embodiments, includes communicating a predicted traffic level and/or a predicted pollution level to a user on an electronic display screen of a hardware computing device.

Computer program products comprising a non-transitory computer readable storage medium storing computer program code executable to perform operations for machine learning traffic determination are presented. In certain embodiments, an operation includes receiving an image of vehicular traffic taken by an image sensor. An operation, in one embodiment, includes receiving environmental data from a plurality of environmental sensors. In a further embodiment, an operation includes determining a history of vehicular traffic in a geographic area associated with an image sensor. An operation, in some embodiments, includes processing an image of vehicular traffic, environmental data, and/or a history of vehicular traffic using one or more machine learning models to predict a traffic level and/or a pollution level for a geographic area. An operation, in another embodiment, includes communicating a predicted traffic level and/or a predicted pollution level to a user on an electronic display screen of a hardware computing device.

Methods for machine learning traffic determination are presented. A method, in one embodiment, includes receiving an image of vehicular traffic taken by an image sensor. In some embodiments, a method includes receiving environmental data from a plurality of environmental sensors. A method, in certain embodiments, includes determining a history of vehicular traffic in a geographic area associated with an image sensor. In a further embodiment, a method includes processing an image of vehicular traffic, environmental data, and/or a history of vehicular traffic using one or more machine learning models to predict a traffic level and/or a pollution level for a geographic area. A method, in some embodiments, includes communicating a predicted traffic level and/or a predicted pollution level to a user on an electronic display screen of a hardware computing device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Aspects of the present invention are described herein with reference to system diagrams, flowchart illustrations, and/or block diagrams of methods, apparatuses, systems, and computer program products according to embodiments of the invention. It will be understood that blocks of the flowchart illustrations and/or block diagrams, and combinations of blocks in the flowchart illustrations and/or block diagrams, can be implemented by computer readable program instructions.

Figure 1:
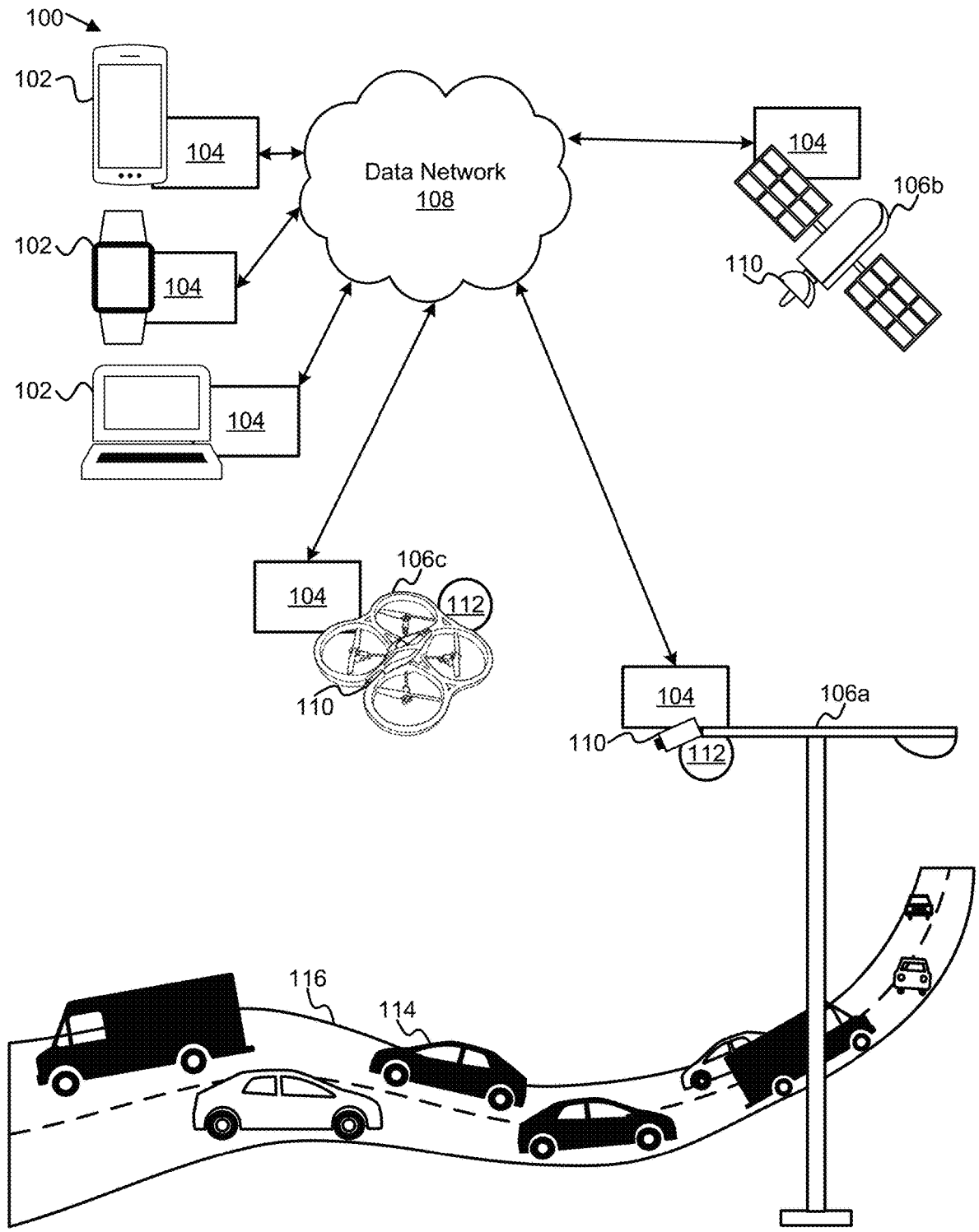
FIG. 1 is a perspective view illustrating one embodiment of a system for machine learning traffic determination.

FIG. 1 depicts one embodiment of a system 100 for machine learning traffic determination. The system 100, in the depicted embodiment, includes one or more hardware computing devices 102 (e.g., with electronic display screens or the like), one or more electronic hardware traffic devices 104, one or more sensor mount devices 106 (e.g., a pole 106a, a satellite 106b, an airborne drone 106c, one or more vehicles 114, or the like), a data network 108, one or more image sensors 110, one or more environmental sensors 112, one or more vehicles 114, and one or more roads 116 and/or other geographic areas 116.

In general, an electronic hardware traffic device 104 is configured to receive one or more images (e.g., still images, videos, video frames, or the like) of vehicular traffic 114 (e.g., of one or more vehicles 114 on a road 116 and/or in a geographic area 116) from one or more image sensors 110, to receive environmental data from one or more environmental sensors 112, to determine a history of vehicular traffic 114, or the like and to process the images, environmental data, and/or history of vehicular traffic using one or more machine learning models to predict a traffic level, a pollution level, or the like for a geographic area 116. An electronic hardware traffic device 104 may communicate a predicted traffic level, a pollution level, or the like to a user on an electronic display screen of a hardware computing device 102, or the like (e.g., in a graphical user interface; as a text message, push notification, email, or other communication; over an application programming interface; or the like).

By predicting and providing traffic level and/or pollution level predictions to users, an electronic hardware traffic device 104, in some embodiments, may reduce certain carbon emissions, noise pollution, or the like, may reduce traffic levels, or the like. An electronic hardware traffic device 104 may comprise a hybrid deep learning neural network and/or other machine learning that provides users real-time and/or predicted traffic and/or pollution levels in an efficient, affordable manner. For example, in certain embodiments, an electronic hardware traffic device 104 may comprise one or more machine learning models (e.g., for image recognition and/or classification, object/event detection, sequence learning, time series processing and/or prediction, or the like) trained on images (e.g., still images, video, video frames, or the like) of vehicular traffic 114, environmental data, historical time series vehicular traffic data and/or environmental data, or the like.

In various embodiments, an electronic hardware traffic device 104 may use a convolutional neural network, a deep learning model, a long short-term memory (LSTM) model, a single-label classification model, a multi-label classification model, an image segmentation model, an object detection model, a support vector machine model, a scale-invariant feature transform model, a maximally stable extremal regions model, a speeded-up robust features model, a histogram of oriented gradients model, a rule-based classification model, a region-based convolutional neural network, a region proposal network model, a single shot detector model, a K-means clustering model, an iterative self-organizing data analysis technique model, a maximum likelihood model, a minimum distance model, a residual network model, and/or another machine learning model configured to process images from one or more image sensors 110, environmental data from one or more environmental sensors 112, and/or a history of vehicular traffic in a geographic area 116 to predict a traffic level and/or a pollution level for the geographic area 116, or the like.

An electronic hardware traffic device 104 may comprise one or more machine learning models that take as input images of vehicular traffic 114, environmental data, a history of vehicular traffic, a history of environmental data, and/or other data and output a predicted traffic level, a predicted pollution level, or the like. An electronic hardware traffic device 104 may be efficient and/or affordable enough for use in substantially any geographic area 116, even remote and/or underdeveloped areas 116.

An electronic hardware traffic device 104 may allow users to easily search a destination, time, and/or distance away that they are planning to travel, and to either receive real-time traffic and/or pollution data and/or predicted traffic and/or pollution levels at a geographic location 116 (e.g., a road 116, a route 116, or the like). For example, an electronic hardware traffic device 104 may reroute navigation of a vehicle 114 based on real-time and/or predicted traffic and/or pollution levels, or the like (e.g., to reduce traffic and/or pollution, to spread out traffic and/or pollution, to reduce driving time to a destination, or the like).

Further, in some embodiments, an electronic hardware traffic device 104 may be disposed in a remote and/or underdeveloped area, where other types of traffic sensors may be prohibitively expensive. For example, a single image sensor 110 (e.g., a pre-existing overhead traffic camera 110 and/or security camera 110 disposed on a nearby pole 106a or post 106a, a camera 110 or other image sensor 110 of a satellite 106b, a camera 110 or other image sensor 110 of an airborne drone 106c, or the like) may cover an entire geographic area 116, multiple geographic areas 116 (e.g., from a satellite 106b and/or drone 106c), one or several roads 116, or the like.

A plurality of environmental sensors 112, in some embodiments, may be in communication with an electronic hardware traffic device 104. For example, several different environmental sensors 112 may be coupled and/or integrated (e.g., into a single and/or low-cost unit 112, or the like), such as a thermometer 112 or other temperature sensor 112, a humidity sensor 112, a particulate matter sensor 112, a carbon dioxide sensor 112, a nitrogen dioxide sensor 112, a volatile organic compound sensor 112, a methane sensor 112, a microphone 112 or other noise sensor 112, and/or another environmental sensor 112 configured to detect one or more environmental attributes of a geographic area 116. One or more machine learning models of an electronic hardware traffic device 104 may receive environmental data (e.g., a temperature, a humidity, particulate matter data, a carbon dioxide level, a nitrogen dioxide level, a volatile organic compound level, a methane level, a noise level, and/or other environmental data) and process the environmental data to predict a traffic level and/or a pollution level, or the like.

One or more cameras 110, one or more environmental sensors 112, and/or other sensors 110, 112 may be directly coupled to and/or in direct communication with an electronic hardware traffic device 104, and/or may be in communication with an electronic hardware traffic device 104 over a wireless and/or wired data network 108. For example, one or more image sensors 110 and/or one or more environmental sensors 112 may be coupled to a satellite 106b orbiting such that a geographic area 116 is in view of the image sensor 110 (e.g., a satellite with a low earth orbit below an altitude of 2,000 kilometers, an orbit period of 128 minutes or less, or the like), may be coupled to an airborne drone 106c flying in proximity to a geographic area 116, may be coupled to a pole 106a and/or post 106a with an overhead view of a geographic area 116, or the like.

An electronic hardware traffic device 104, in certain embodiments, may be configured to process and/or make predictions for image sensors 110 and/or environmental sensors 112 with a wide variety of lighting and/or camera 110 angles, a variety of obstacles and/or weather conditions, or the like. An electronic hardware traffic device 104 may process image data (e.g., one or more images of vehicular traffic), environmental data, and/or a history of vehicular traffic in a geographic area 116 to predict a traffic level (e.g., a number of vehicles 114, a number of vehicles 114 per a time period, a speed of one or more vehicles 114, an estimated traffic delay, and/or another traffic indicator), to predict a pollution level (e.g., a particulate level, a carbon dioxide level, a nitrogen dioxide level, a volatile organic compound level, a methane level, a noise level in decibels or the like, a health quality level or other indicator of human health quality, and/or another pollution indicator), and/or to make another traffic related prediction.

In some embodiments, an electronic hardware traffic device 104 may provide an interface (e.g., a graphical user interface (GUI), a command line interface (CLI), an application programming interface (API), or the like) to one or more users, allowing a user to provide the electronic hardware traffic device 104 access to one or more image sensors 110, one or more environmental sensors 112, or the like, allowing the electronic hardware traffic device 104 to monitor and/or predict traffic and/or pollution levels in a geographic area 116. For example, a local, regional, and/or national governmental agency may be interested in reducing traffic and/or pollution using an electronic hardware traffic device 104 and may install and/or otherwise provide access to one or more image sensors 110, environmental sensors 112, a time series or other history of vehicular traffic, and/or other data in order to predict traffic and/or pollution levels, simulate an impact of one or more adjustments on predicted traffic and/or pollution levels, to reroute navigation routes of drivers based on traffic and/or pollution levels, or the like.

An electronic hardware traffic device 104, in certain embodiments, may comprise one or more machine learning models selected and/or tuned to execute on inexpensive and/or efficient computing hardware, such as a mobile computer hardware device 102, an embedded hardware device 102, hardware of an image sensor 110 and/or environmental sensor 112, another edge hardware device 102, and/or a combination thereof. In a further embodiment, at least a portion of a machine learning model and/or other executable code of an electronic hardware traffic device 104 may execute on a backend hardware server device 102, or the like, remote from one or more image sensors 110 and/or environmental sensors 112 (e.g., to combine traffic level and/or pollution level predictions from multiple geographic areas 116, to communicate traffic levels and/or pollution levels to a user on an electronic display screen of a hardware computing device 102, or the like).

An electronic hardware traffic device 104 may be configured to receive images (e.g., still images, video, video frames, or the like) of vehicular traffic 114 in a geographic area 116 taken by one or more image sensors 110 and/or environmental data from one or more environmental sensors 112. An electronic hardware traffic device 104, in cooperation with one or more image sensors 110 and/or environmental sensors 112, in various embodiments, may substantially continuously take video or other images of vehicular traffic 114 and/or monitor environmental data, may periodically take images of vehicular traffic 114 and/or monitor environmental data at one or more increments (e.g., a predetermined number of seconds, minutes, hours or the like; an orbit period of one or more satellites 106*b*; or the like), may convert video and/or video frames into still images, or the like. An electronic hardware traffic device 104 may determine a history of vehicular traffic 114 in a geographic area 116 based on previous images of vehicular traffic 114 in the geographic area 116, by receiving time series data indicating a history of vehicular traffic 114 in the geographic area 116 from a user and/or a third-party, or the like.

In some embodiments, in addition to or instead of performing real time determinations of traffic levels and/or pollution levels, an electronic hardware traffic device 104 may be configured to predict a traffic level and/or a pollution level at a future point in time (e.g., using one or more machine learning models, using regression, using a recurrent neural network model such as LSTM, based on a time series and/or other history of vehicular traffic 114 and/or of pollution levels, or the like). In one embodiment, an electronic hardware traffic device 104 may select the future point in time for the predictions based on user input.

An electronic hardware traffic device 104, in one embodiment, is configured to communicate to a user (e.g., on an electronic display screen of a hardware computing device 102, over a speaker of a hardware computing device 102, or the like) a real-time traffic level and/or pollution level, a predicted traffic level and/or pollution level, or the like. For example, an electronic hardware traffic device 104 may provide a website available to users on hardware computing devices 102 over a data network 108, a mobile and/or desktop application executable on a hardware computing device 102, a message or other communication (e.g., an email, text message, push notification, or the like), and/or another user interface displaying actual and/or predicted traffic levels and/or pollution levels.

An electronic hardware traffic device 104 may display a traffic level as a number (e.g., a speed, a delay time, or the like), as a graphical representation (e.g., an icon, a color such as red/yellow/green, an image, an animation, and/or another indicator), or the like. An electronic hardware traffic device 104 may display a pollution level as a number (e.g., a particulate level, a carbon dioxide level, a nitrogen dioxide level, a volatile organic compound level, a methane level, a noise level in decibels or the like, a health quality level or other indicator of human health quality, and/or another pollution indicator), as a graphical representation (e.g., an icon, a color such as red/yellow/green, an image, an animation, and/or another indicator). For example, in one embodiment, an electronic hardware traffic device 104 may display a pollution level as a heatmap (e.g., with darker colors representing higher pollution levels, with warmer colors representing higher pollution levels, or the like), which may be overlayed on a geographic map of a geographic area 116, or the like (e.g., in addition to traffic level information, or the like).

In some embodiments, an electronic hardware traffic device 104 displays a graphical user interface comprising a navigation interface, displaying a predicted traffic level and/or a predicted pollution level relative to a navigation route, or the like. An electronic hardware traffic device 104 may dynamically reroute the navigation route based on an actual and/or predicted pollution level (e.g., in addition to routing based on a traffic level, routing away from higher pollution levels, routing toward lower pollution levels, or the like).

An electronic hardware traffic device 104, in a further embodiment, displays a graphical user interface comprising a simulation, allowing a user to simulate one or more proposed changes to the vehicular traffic 114, and the resulting simulated impact on a predicted traffic level and/or a predicted pollution level. For example, a local, regional, and/or national governmental entity may desire to simulate one or more traffic 114 adjustments or plans, and to visualize the resulting changes in traffic levels and/or pollution levels. An electronic hardware traffic device 104, in certain embodiments, may display one or more user interface elements (e.g., a slider, a dropdown menu, a text box, or the like) allowing a user to input a proposed change to vehicular traffic 114 (e.g., a percentage change, a change in number of vehicles per time period, a change in traffic speed, or the like) and the electronic hardware traffic device 104 may process the proposed change using one or more machine learning models to predict one or more changes to a traffic level and/or a pollution level in response to the proposed change.

In certain embodiments, an electronic hardware traffic device 104 may display substantially real time data for vehicular traffic 116 and/or pollution in a geographic area 116 (e.g., video or other images of vehicular traffic 114, environmental data from one or more environmental sensors 112, or the like) to a user (e.g., on a website, in an executable application, or the like) on an electronic display screen of a hardware computing device 102.

An electronic hardware traffic device 104, in some embodiments, provides a graphical user interface to a user on an electronic display screen of a hardware computing device 102 (e.g., a website, an executable application, a navigation system of a vehicle 114, or the like) allowing the user to enter a navigation destination or other location, provide their current location, or the like and the electronic hardware traffic device 104 may display one or more traffic levels and/or pollution levels (e.g., along a navigation route, at a current location, or the like). In some embodiments, an electronic hardware traffic device 104 may reroute a navigation route (e.g., suggest a new route to a user for confirmation) based on a predicted pollution level and/or a predicted traffic level (e.g., rerouting to reduce overall pollution, rerouting toward a geographic area 116 with lower pollution, or the like).

For example, an electronic hardware traffic device 104 may provide a graphical user interface allowing a user to provide a destination or other location, a date and/or time of day, and/or other information and the electronic hardware traffic device 104 may display predicted traffic levels and/or pollution levels according to the provided input. In a further embodiment, an electronic hardware traffic device 104 may integrate display and/or other communication of traffic levels and/or pollution levels into a navigation interface displayed on an electronic display screen of a hardware computing device 102 and/or a vehicle 114 (e.g., displaying traffic levels and/or pollution levels along a navigation route, at a current location, or the like). In some embodiments, an electronic hardware traffic device 104 may communicate and/or notify a user of a traffic level and/or a pollution level.

In a further embodiment, an electronic hardware traffic device 104 may automatically detect and/or define vehicles 114, vehicle 114 speeds, or the like in an image from an image sensor 110. For example, an electronic hardware traffic device 104 may process an initial and/or previous image of vehicular traffic 114 in a geographic area 116 using one or more machine learning models to detect a number of objects 114 comprising a vehicle 114, one or more speeds of vehicles 114, or the like.

In one embodiment, one or more image sensors 110 and/or environmental sensors 112 are directly and/or indirectly coupled to an electronic hardware traffic device 104 (e.g., electrically coupled, digitally coupled over a data network 108, or the like), with each image sensor 110 and/or environmental sensor 112 in proximity to vehicular traffic 114 in a geographic area 116. In some embodiments, an image sensor 110 and/or environmental sensor 112 may be remote from an electronic hardware traffic device 104 (e.g., comprising, disposed on, and/or executing on a backend server device 102, or the like) and the electronic hardware traffic device 104 may receive data from one or more sensors 110, 112 over a data network 108 (e.g., using an application programming interface of the electronic hardware traffic device 104, or the like).

In some embodiments, an electronic hardware traffic device 104 may comprise logic hardware such as one or more of a processor (e.g., a CPU, a controller, a microcontroller, firmware, microcode, an application specific integrated circuit (ASIC), a field programmable gate array (FPGA) or other programmable logic, or the like), a volatile memory, a non-volatile computer readable storage medium, a network interface, a printed circuit board, or the like. An electronic hardware traffic device 104, in further embodiments, may include computer program code stored on a non-transitory computer readable storage medium (e.g., of a hardware computing device 102), executable by a processor to perform one or more of the operations described herein, or the like.

An electronic hardware traffic device 104, in certain embodiments, may receive one or more commands, user input, or the like from a hardware computing device 102; may send one or more notifications, messages, alerts or the like to a hardware computing device 102 over a data network 108; and/or otherwise be in communication with a hardware computing device 102 (e.g., a control panel; a server computing device; a mobile computing device such as a smartphone, a smart watch, a tablet, a laptop, or the like; a desktop computer; and/or another hardware computing device 102 comprising a processor and a memory).

The data network 108, in one embodiment, includes a digital communication network that transmits digital communications. The data network 108 may include a hardwired network, a serial bus, a wireless network, such as a wireless cellular network, a local wireless network, such as a Wi-Fi network, a Bluetooth® network, a near-field communication (NFC) network, an ad hoc network, or the like. The data network 108 may include a wide area network (WAN), a local area network (LAN), an optical fiber network, the internet, or other digital communication network. The data network 108 may include a combination of two or more networks. The data network 108 may include one or more servers, routers, switches, and/or other networking equipment.

One or more electronic hardware traffic devices 104, hardware computing devices 102, and/or image sensors 110 may be in communication over a data network 108, either directly or indirectly through a backend server computing device 102, or the like. An electronic hardware traffic device 104 executing on a hardware computing device 102 (e.g., computer executable program code, an installable application, a mobile application, or the like), in some embodiments, may provide a user interface to notify a user and/or for a user to perform one or more actions and/or selections described herein.

Figure 2:
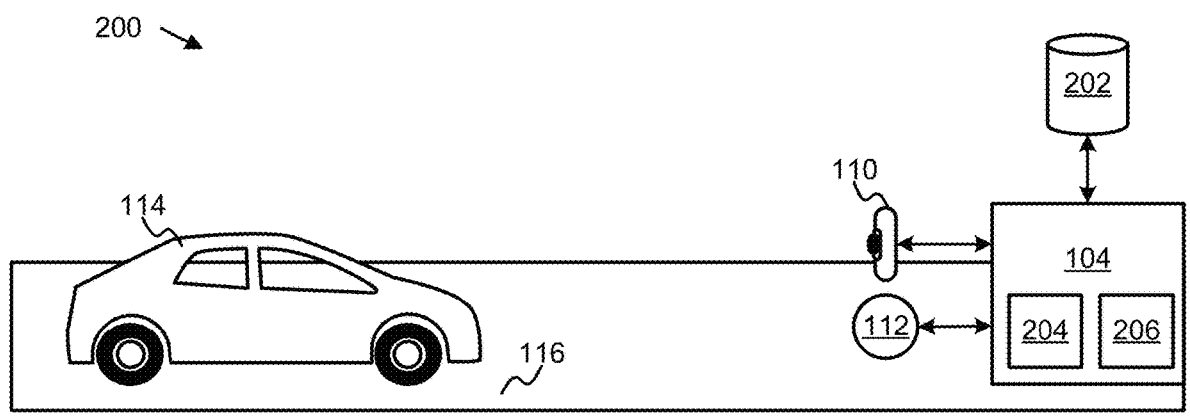
FIG. 2 is a schematic block diagram illustrating a further embodiment of a system for machine learning traffic determination.

FIG. 2 depicts one embodiment of a system 200 for machine learning traffic determination. The electronic hardware traffic device 104, the image sensor 110, the environmental sensor 112, the vehicle 114, and/or the geographic area 116 of FIG. 2, in some embodiments, may be substantially similar to the electronic hardware traffic device 104, the image sensor 110, the environmental sensor 112, the vehicle 114, and/or the geographic area 116 described above with regard to FIG. 1. In the depicted embodiment, the electronic hardware traffic device 104 includes a processor 204 and a memory 206, and receives data 202 comprising a history of vehicular traffic 114 (e.g., from a database 202 or other data structure 202 maintained by the electronic hardware traffic device 104, from a third-party database 202, or the like).

In some embodiments, an electronic hardware traffic device 104 may comprise computer program code stored in a memory 206 and executable by a processor 204 to perform one or more of the operations described herein with regard to an electronic hardware traffic device 104. For example, a processor 204 may comprise a CPU, a controller, a microcontroller, firmware, microcode, an ASIC, an FPGA or other programmable logic, or the like and a memory 206 may comprise a volatile memory, a non-transitory computer readable storage medium, or the like in communication with the processor 204.

Figure 3:
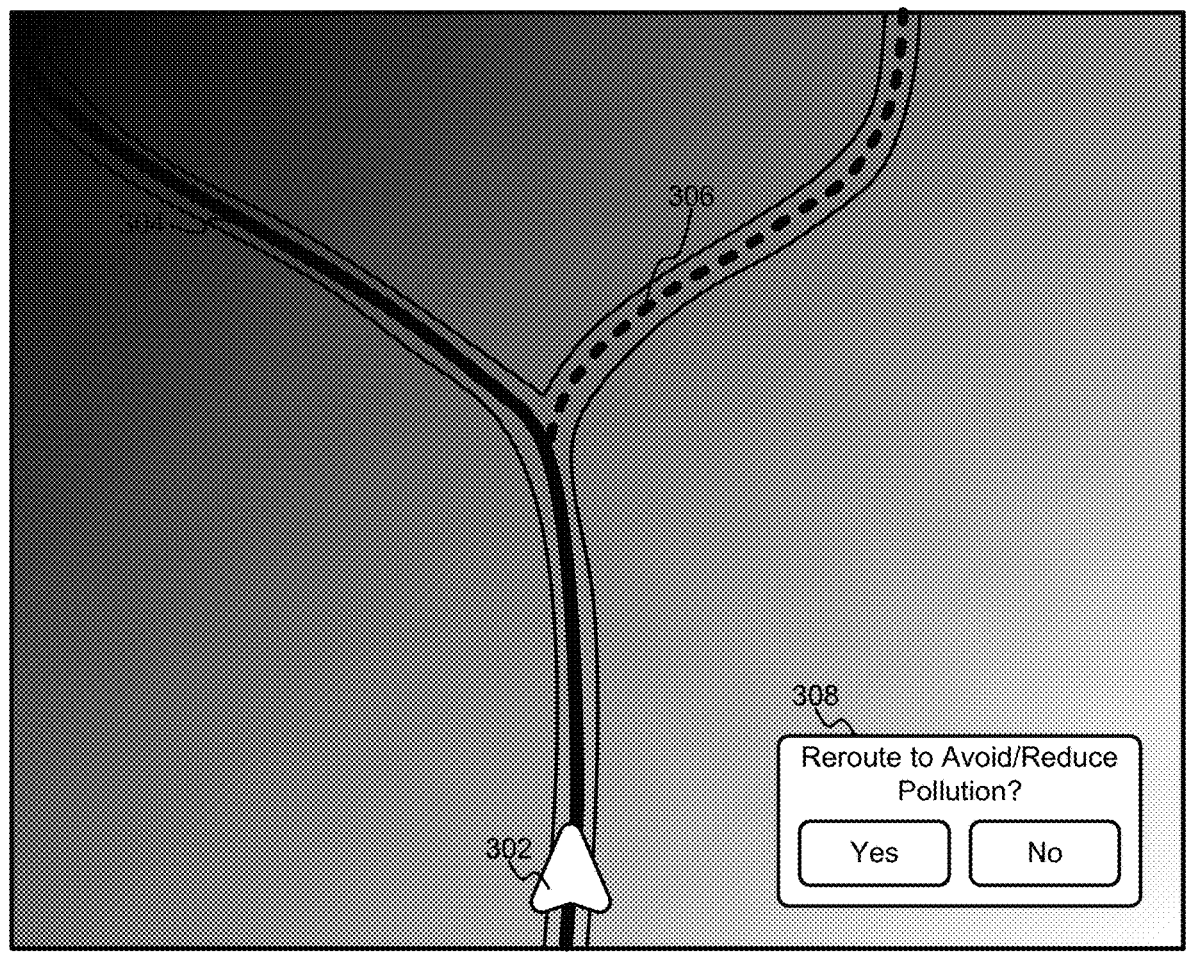
FIG. 3 is a schematic block diagram illustrating one embodiment of a graphical user interface for machine learning traffic determination.

FIG. 3 depicts one embodiment of a graphical user interface 300 for machine learning traffic determination. For example, an electronic hardware traffic device 104 may display a graphical user interface 300 on an electronic display screen of a hardware computing device 102, on a navigation system of a vehicle 114, or the like. The graphical user interface 300, in the depicted embodiment, includes a displayed vehicle icon 302, a navigation route 304, a rerouted navigation route 306, and a reroute prompt 308. The graphical user interface 300 comprises an overlaid heatmap indicating that the navigation route 304 passes through a geographic area with a higher pollution level (e.g., higher than a potential rerouted navigation route 306, above a threshold pollution level, or the like).

An electronic hardware traffic device 104 determines that a predicted pollution level for the navigation route 304 is higher than a predicted pollution level for the rerouted navigation route 306 and prompts 308 a user to take the rerouted navigation route 306. In some embodiments, an electronic hardware traffic device 104 may also determine whether or not to prompt 308 a rerouted navigation route 306 based at least partially on predicted traffic levels, differences in distances and/or travel times for the routes 304, 306, or the like.

Figure 4:
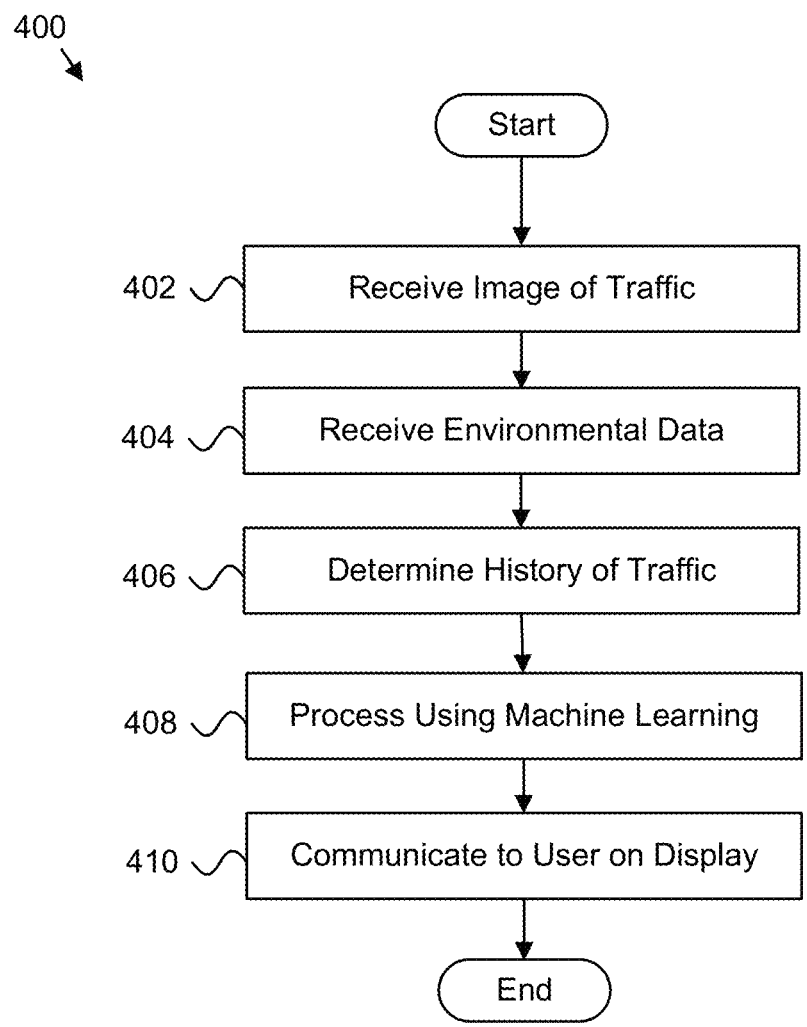
FIG. 4 is a schematic flow chart diagram illustrating one embodiment of a method for machine learning traffic determination.

FIG. 4 depicts one embodiment of a method 400 for machine learning traffic determination. The method 400 begins and an electronic hardware traffic device 104 receives 402 an image of vehicular traffic 114 taken by an image sensor 110. An electronic hardware traffic device 104 receives 404 environmental data from a plurality of environmental sensors 112. An electronic hardware traffic device 104 determines 406 a history 202 of vehicular traffic 114 in a geographic area 116 associated with the image sensor 110.

An electronic hardware traffic device 104 processes 408 the image of the vehicular traffic 114, the environmental data, and the history 202 of vehicular traffic 114 using one or more machine learning models to predict a traffic level and/or a pollution level for the geographic area 116. An electronic hardware traffic device 104 communicates 410 one or more of a predicted traffic level and a predicted pollution level to a user, on an electronic display screen of a hardware computing device 102 and the method 400 ends.

Figure 5:
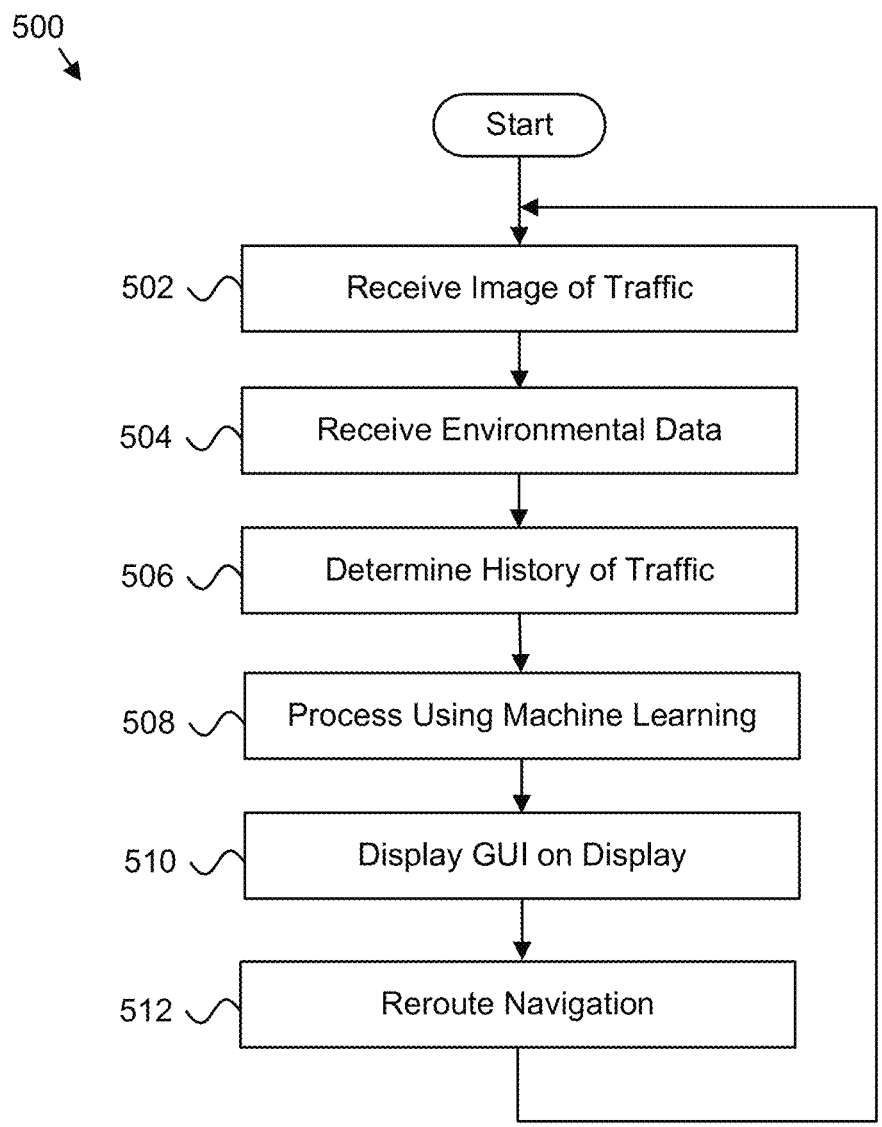
FIG. 5 is a schematic flow chart diagram illustrating a further embodiment of a method for machine learning traffic determination.

FIG. 5 depicts one embodiment of a method 500 for machine learning traffic determination. The method 500 begins and an electronic hardware traffic device 104 receives 502 an image of vehicular traffic 114 taken by an image sensor 110. An electronic hardware traffic device 104 receives 504 environmental data from a plurality of environmental sensors 112. An electronic hardware traffic device 104 determines 506 a history 202 of vehicular traffic 114 in a geographic area 116 associated with the image sensor 110.

An electronic hardware traffic device 104 processes 508 the image of the vehicular traffic 114, the environmental data, and the history 202 of vehicular traffic 114 using one or more machine learning models to predict a traffic level and/or a pollution level for the geographic area 116. An electronic hardware traffic device 104 displays 510 one or more of a predicted traffic level and a predicted pollution level to a user, in a graphical user interface comprising a navigation interface, on an electronic display screen of a hardware computing device 102. An electronic hardware traffic device 104 reroutes 512 a navigation route based at least on the predicted pollution level and the method 500 continues with subsequently received 502, 504 images, environmental data, and the like.

Figure 6:
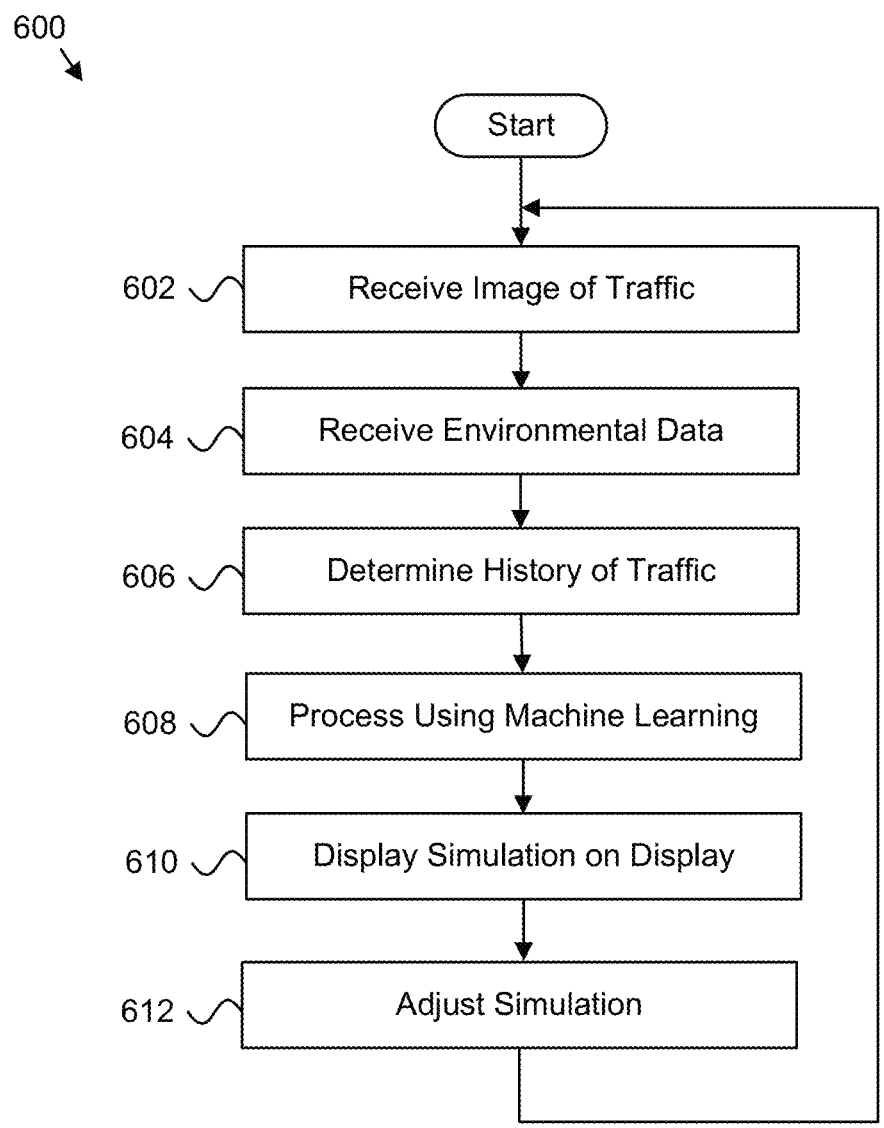
FIG. 6 is a schematic flow chart diagram illustrating a further embodiment of a method for machine learning traffic determination.

FIG. 6 depicts one embodiment of a method 600 for machine learning traffic determination. The method 600 begins and an electronic hardware traffic device 104 receives 602 an image of vehicular traffic 114 taken by an image sensor 110. An electronic hardware traffic device 104 receives 604 environmental data from a plurality of environmental sensors 112. An electronic hardware traffic device 104 determines 606 a history 202 of vehicular traffic 114 in a geographic area 116 associated with the image sensor 110.

An electronic hardware traffic device 104 processes 608 the image of the vehicular traffic 114, the environmental data, and the history 202 of vehicular traffic 114 using one or more machine learning models to predict a traffic level and/or a pollution level for the geographic area 116. An electronic hardware traffic device 104 displays 610 one or more of a predicted traffic level and a predicted pollution level to a user, in a graphical user interface comprising a simulation, on an electronic display screen of a hardware computing device 102. An electronic hardware traffic device 104 adjusts 612 the simulation to depict an impact of one or more proposed changes to the vehicular traffic 114 on the predicted traffic level and/or the predicted pollution level and the method 600 continues with subsequently received 602, 604 images, environmental data, and the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments. These features and advantages of the embodiments will become more fully apparent from the following description and appended claims or may be learned by the practice of embodiments as set forth hereinafter.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules to emphasize their implementation independence more particularly. For example, a module may be implemented as a hardware circuit comprising custom very large scale integrated ("VLSI") circuits or gate arrays, off-the-shelf semiconductor circuits such as logic chips, transistors, or other discrete components. A module may also be implemented in programmable hardware devices such as an FPGA, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a server, cloud storage (which may include one or more services in the same or separate locations), a hard disk, a solid state drive ("SSD"), an SD card, a random access memory ("RAM"), a read-only memory ("ROM"), an erasable programmable read-only memory ("EPROM" or Flash memory), a static random access memory ("SRAM"), a Blu-ray disk, a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, a personal area network, a wireless mesh network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages.

The computer readable program instructions may execute entirely on the user's computer, partly on the user's computer, as a stand-alone software package, partly on the user's computer and partly on a remote computer or service or entirely on the remote computer or server or set of servers. In the latter scenario, the remote computer may be connected to the user's computer through any type of network, including the network types previously listed. Alternatively, the connection may be made to an external computer (for example, through the Internet using an Internet Service Provider). In some embodiments, electronic circuitry including, for example, programmable logic circuitry, FPGA, or programmable logic arrays ("PLA") may execute the computer readable program instructions by utilizing state information of the computer readable program instructions to personalize the electronic circuitry to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical functions.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Means for performing the steps described herein, in various embodiments, may include one or more of a network interface, a controller (e.g., a CPU, a processor core, an FPGA or other programmable logic, an ASIC, a microcontroller, and/or another semiconductor integrated circuit device), a hardware appliance or other hardware device, other logic hardware, and/or other executable code stored on a computer readable storage medium. Other embodiments may include similar or equivalent means for performing the steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   an image sensor;
   a plurality of environmental sensors;
   an electronic hardware traffic device in communication with the image sensor and the plurality of environmental sensors, the electronic hardware traffic device comprising a processor and a memory, the memory storing computer program code executable by the processor to perform operations, the operations comprising:
   receiving an image of vehicular traffic taken by the image sensor;
   receiving environmental data from the plurality of environmental sensors;
   determining a history of vehicular traffic in a geographic area associated with the image sensor based on an historical time series of previous images of vehicular traffic data for the geographic area;
   processing the image of the vehicular traffic, the environmental data, and the history of vehicular traffic using one or more machine learning models to predict a traffic level and a pollution level for the geographic area; and
   communicating one or more of the predicted traffic level and the predicted pollution level to a user, on an electronic display screen of a hardware computing device.

2. The apparatus of claim 1, wherein the plurality of environmental sensors comprises one or more of a temperature sensor, a humidity sensor, a particulate matter sensor, a carbon dioxide sensor, a nitrogen dioxide sensor, a volatile organic compound sensor, a methane sensor, and a noise sensor.

3. The apparatus of claim 1, wherein the plurality of environmental sensors comprises a temperature sensor, a humidity sensor, a particulate matter sensor, a carbon dioxide sensor, a nitrogen dioxide sensor, a volatile organic compound sensor, a methane sensor, and a noise sensor.

4. The apparatus of claim 1, wherein the image sensor comprises an overhead traffic camera in proximity to the geographic area.

5. The apparatus of claim 1, wherein the image sensor is coupled to a satellite orbiting such that the geographic area is in view of the image sensor.

6. The apparatus of claim 5, wherein the satellite has a low earth orbit below an altitude of 2,000 kilometers and an orbit period of 128 minutes or less.

7. The apparatus of claim 1, wherein the image sensor is coupled to an airborne drone flying in proximity to the geographic area.

8. The apparatus of claim 7, wherein the plurality of environmental sensors are coupled to the airborne drone.

9. The apparatus of claim 1, wherein the one or more machine learning models predict the traffic level and the pollution level at a future point in time based on the image of the vehicular traffic, the environmental data, and the history of vehicular traffic.

10. The apparatus of claim 1, the operations further comprising displaying a graphical user interface on the electronic display screen, the graphical user interface comprising the communicated one or more of the predicted traffic level and the predicted pollution level.

11. The apparatus of claim 10, wherein the graphical user interface comprises a simulation depicting an impact of one or more proposed changes to the vehicular traffic on the communicated one or more of the predicted traffic level and the predicted pollution level.

12. The apparatus of claim 10, wherein the graphical user interface comprises a navigation interface displaying the communicated one or more of the predicted traffic level and the predicted pollution level relative to a navigation route of the navigation interface.

13. The apparatus of claim 12, the operations further comprising rerouting the navigation route based on the predicted pollution level.

14. The apparatus of claim 1, wherein the predicted pollution level is communicated as an indicator of human health quality.

15. A computer program product comprising a non-transitory computer readable storage medium storing computer program code executable to perform operations, the operations comprising:
- receiving an image of vehicular traffic taken by an image sensor;
- receiving environmental data from a plurality of environmental sensors;
- determining a history of vehicular traffic in a geographic area associated with the image sensor based on an historical time series of previous images of vehicular traffic data for the geographic area;
- processing the image of the vehicular traffic, the environmental data, and the history of vehicular traffic using one or more machine learning models to predict a traffic level and a pollution level for the geographic area; and
- communicating one or more of the predicted traffic level and the predicted pollution level to a user, on an electronic display screen of a hardware computing device.

16. The computer program product of claim 15, wherein the plurality of environmental sensors comprises one or more of a temperature sensor, a humidity sensor, a particulate matter sensor, a carbon dioxide sensor, a nitrogen dioxide sensor, a volatile organic compound sensor, a methane sensor, and a noise sensor.

17. The computer program product of claim 15, wherein the one or more machine learning models predict the traffic level and the pollution level at a future point in time based on the image of the vehicular traffic, the environmental data, and the history of vehicular traffic.

18. The computer program product of claim 15, the operations further comprising displaying a graphical user interface on the electronic display screen, the graphical user interface comprising the communicated one or more of the predicted traffic level and the predicted pollution level, wherein the graphical user interface comprises a simulation depicting an impact of one or more proposed changes to the vehicular traffic on the communicated one or more of the predicted traffic level and the predicted pollution level.

19. The computer program product of claim 15, the operations further comprising:
- displaying a graphical user interface on the electronic display screen, the graphical user interface comprising the communicated one or more of the predicted traffic level and the predicted pollution level, wherein the graphical user interface comprises a navigation interface displaying the communicated one or more of the predicted traffic level and the predicted pollution level relative to a navigation route of the navigation interface; and
- rerouting the navigation route based on the predicted pollution level.

20. A method comprising:
- receiving an image of vehicular traffic taken by an image sensor;
- receiving environmental data from a plurality of environmental sensors;
- determining a history of vehicular traffic in a geographic area associated with the image sensor based on an historical time series of previous images of vehicular traffic data for the geographic area;
- processing the image of the vehicular traffic, the environmental data, and the history of vehicular traffic using one or more machine learning models to predict a traffic level and a pollution level for the geographic area; and
- communicating one or more of the predicted traffic level and the predicted pollution level to a user, on an electronic display screen of a hardware computing device.

* * * * *